(12) United States Patent
Liu et al.

(10) Patent No.: US 12,464,339 B2
(45) Date of Patent: Nov. 4, 2025

(54) METHOD AND APPARATUS FOR PROVIDING ONBOARDING AND PROVISIONING SERVICES

(71) Applicant: Lenovo (Beijing) Ltd., Beijing (CN)

(72) Inventors: Jianning Liu, Haidian District (CN);
Genadi Velev, Darmstadt (DE);
Andreas Kunz, Ladenburg (DE);
Tingfang Tang, Haidian District (CN);
Sheeba Backia Mary Baskaran, Friedrichsdorf (DE)

(73) Assignee: Lenovo (Beijing) Ltd., Beijing (CN)

(*) Notice: Subject to any disclaimer, the term of this patent is extended or adjusted under 35 U.S.C. 154(b) by 498 days.

(21) Appl. No.: 17/917,409

(22) PCT Filed: Apr. 10, 2020

(86) PCT No.: PCT/CN2020/084269
§ 371 (c)(1),
(2) Date: Oct. 6, 2022

(87) PCT Pub. No.: WO2021/203427
PCT Pub. Date: Oct. 14, 2021

(65) Prior Publication Data
US 2023/0156457 A1      May 18, 2023

(51) Int. Cl.
*H04W 8/20*   (2009.01)
*H04W 60/04*  (2009.01)

(52) U.S. Cl.
CPC .............. *H04W 8/20* (2013.01); *H04W 60/04* (2013.01)

(58) Field of Classification Search
CPC ....... H04W 12/35; H04W 4/50; H04W 12/06; H04W 8/18; H04W 12/125; H04W 8/24;
(Continued)

(56) References Cited

U.S. PATENT DOCUMENTS

| 11,012,830 B2 * | 5/2021 | Sharaga ................ H04W 4/50 |
| 2014/0207486 A1 * | 7/2014 | Carty .................... G16H 40/67 705/2 |

(Continued)

FOREIGN PATENT DOCUMENTS

CN        110098948 A        8/2019

OTHER PUBLICATIONS

3GPP TR 23.700-07 V0.3.0, "3rd Generation Partnership Project; Technical Specification Group Services and System Aspects; Study on enhanced support of non-public networks", Release 17, Jan. 2020 (Year: 2020).*

(Continued)

*Primary Examiner* — Dung Hong
(74) *Attorney, Agent, or Firm* — FIG. 1 Patents

(57) ABSTRACT

Embodiments of the present application are directed to a method and apparatus for providing onboarding and provisioning services. A method according to an embodiment of the present application may include: receiving a registration request for a user equipment (UE), wherein the register request indicates an identity of the UE, an onboarding and provisioning flag, and an onboarding and provisioning function (OPF) identity; selecting an OPF entity at least based on the OPF identity in the case of an onboarding request being supported for the UE; and transmitting the onboarding request at least indicating the identity of the UE to the selected OPF entity.

20 Claims, 7 Drawing Sheets

(58) Field of Classification Search
CPC .. H04W 12/04; H04W 12/08; H04L 63/1466; H04L 9/3242; H04L 63/20
See application file for complete search history.

(56) References Cited

U.S. PATENT DOCUMENTS

| | | | | |
|---|---|---|---|---|
| 2017/0093815 | A1* | 3/2017 | Chen | H04L 67/141 |
| 2019/0132308 | A1* | 5/2019 | Graham | H04L 63/0876 |
| 2019/0200405 | A1* | 6/2019 | Gupta | H04W 4/70 |
| 2020/0076815 | A1 | 3/2020 | Smith et al. | |
| 2020/0186998 | A1* | 6/2020 | Smith | H04W 12/0471 |
| 2020/0213191 | A1* | 7/2020 | Watsen | H04L 61/5014 |
| 2020/0259705 | A1* | 8/2020 | Mercier | H04W 8/005 |
| 2020/0275273 | A1* | 8/2020 | Smith | H04W 12/50 |
| 2020/0351653 | A1* | 11/2020 | Khan | H04W 12/35 |
| 2021/0044580 | A1* | 2/2021 | Grødum | H04W 12/043 |
| 2021/0058784 | A1* | 2/2021 | Kedalagudde | H04W 76/12 |

OTHER PUBLICATIONS

"Study on enhanced support of Non-Public Networks (NPN)", 3GPP TR 23.700-07, 3rd GPP, Technical Specification Group Services and System Aspects [retrieved Nov. 2, 2022]. Retrieved from the Internet <https://portal.3gpp.org/desktopmodules/Specifications/SpecificationDetails.aspx?specificationId=3655>., Mar. 2021, 248 Pages.

Ericsson , et al., "Solution for UE Onboarding and provisioning for an SNPN", SA WG2 Meeting #S2-136AH, S2-2000518, Incheon, South Korea [retrieved Nov. 2, 2022]. Retrieved from the Internet <https://www.3gpp.org/ftp/Meetings_3GPP_SYNC/SA2/Docs?sortby=sizerev>., Jan. 2020, 6 Pages.

Ericsson , "User Plane based solution to onboarding KI#4", 3GPP TSG-SA WG2 Meeting #136AH, S2-2000192, Incheon, Korea [retrieved Nov. 2, 2022]. Retrieved from the Internet <https://www.3gpp.org/ftp/tsg_sa/WG2_Arch/TSGS2_136AH_Incheon/Docs/>., Jan. 2020, 7 Pages.

PCT/CN2020/084269 , "International Preliminary Report on Patentability", PCT Application No. PCT/CN2020/084269, Oct. 20, 2022, 5 pages.

PCT/CN2020/084269 , "International Search Report and Written Opinion", PCT Application No. PCT/CN2020/084269, Dec. 30, 2020, 6 pages.

* cited by examiner

METHOD AND APPARATUS FOR PROVIDING ONBOARDING AND PROVISIONING SERVICES

TECHNICAL FIELD

Embodiments of the present application generally relate to wireless communication technology, and especially to a method and apparatus for providing onboarding and provisioning services.

BACKGROUND

A private 5G network is also termed a non-public network (NPN). In contrast to a network that offers mobile network services to the general public, the 5G private network provides 5G network services to a clearly defined user organization or group of user organizations. The 5G private network is deployed on the organization's defined premises, such as a campus or a factory. According to 3rd generation partnership project (3GPP) TS 23. 501, there are two types of 5G private network: a standalone non-public network (SNPN), which does not rely on a public land mobile network (PLMN) and is operated by a SNPN operator; and a public network integrated NPN, which is a nonpublic network deployed with the support of a PLAIN network.

In the SNPN, all network functions are located inside a logical perimeter of the defined premises (e.g. a factory) and the SNPN is separated from the public network. The only communication path between the SNPN and the public network is via a firewall. The SNPN is based on 3GPP-defined technologies and is entirely independent on its own dedicated SNPN identifier (ID). The combination of a PLMN ID and a network identifier (NID) may identify an SNPN. A SNPN-enabled user equipment (UE) (also called a SNPN UE) is configured with a subscription permanent identifier (SUN) and credentials for each subscribed SNPN identified by the combination of the MIN ID and the NID.

Normally, a new PLMN UE can get full subscription data from a universal subscriber identity module (USIM) card or an embedded subscriber identity module (eSIM) that configured with the full subscription data, and there is a flexible and specified way to remotely provision the eSIM. However, the SNPN UE has no USIM or eSIM inside. Currently, the SNPN operator (or called a home operator) has to take additional cost to provision the UE, e.g.; manually configure the UE. There is no way for the home operator to remotely provision the UE, especially when the UE is located in another SNPN network.

Therefore; a method for providing onboarding and provisioning services for the SNPN UE is needed.

SUMMARY OF TUE APPLICATION

Embodiments of the present application provide a method and apparatus for providing onboarding and provisioning services.

An embodiment of the present application provides a method. The method may include: receiving a registration request for a user equipment (UE), wherein the register request indicates an identity of the UE, an onboarding and provisioning flag, and an onboarding and provisioning function (OPF) identity; selecting an OPF entity at least based on the OPF identity in the case of an onboarding request being supported for the UE; and transmitting the onboarding request at least indicating the identity of the UE to the selected OPF entity.

In an embodiment of the present application, the method may further include receiving an onboarding response, indicating whether onboarding and provisioning services for the UE can be supported.

In an embodiment of the present application, the method may further include determining whether the onboarding request can be supported for the UE at least based on capability of supporting onboarding and provisioning of a non-public network.

In an embodiment of the present application, the registration request comprises a vendor certificate; and determining whether the onboarding request can be supported for the UE based on at least one of: the vendor certificate, and a local policy of the non-public network.

In an embodiment of the present application, the selected OPF entity is a first OPF entity identified by the OPF identity in the case of the first OPF entity identified by the OPF identity being found. Alternatively, the selected. OPF entity is a configured OPF entity in the case of a first OPF entity identified by the OPF identity not being found. The onboarding request further indicates the OPF identity.

In an embodiment of the present application, the method may further include transmitting a provisioning request indicating the identity of the UE in the case that the onboarding response indicates that the onboarding and provisioning services for the UE can be supported; and receiving a provisioning response including provisioning data.

In an embodiment of the present application, the method may further include transmitting a registration acceptance message including the provisioning data in the case that the onboarding response indicates that the onboarding and provisioning services for the UE can be supported.

In an embodiment of the present application; the provisioning data includes at least one of: an indication whether the UE needs to send an acknowledgement when receiving the provisioning data successfully; and subscription data including: subscriber identity; credential; and home network identity. The subscription data may further include at least one of: access control information; and roaming information.

In an embodiment of the present application, the method may further include rejecting the registration request in the case of the onboarding request not being supported for the UE.

In an embodiment of the present application, the method may further include rejecting the registration request in the case of the onboarding response indicates that the onboarding and provisioning services for the UE cannot be supported.

Another embodiment of the present application provides a method. The method may include: receiving an onboarding request for a user equipment (UE) indicating an identity of the UE; determining whether to provide onboarding and provisioning services for the UE; and transmitting an onboarding response indicating whether the onboarding and provisioning services for the UE is supported.

In an embodiment of the present application, the method may further include receiving a provisioning request indicating the identity of the UE in the case that the onboarding response indicates that the onboarding and provisioning services for the UE can be supported; and transmitting a provisioning response including provisioning data.

In an embodiment of the present application, the provisioning data includes at least one of: an indication whether the UE needs to send an acknowledgement when receiving the provisioning data successfully; and subscription data including: subscriber identity; credential; and home network identity. The subscription data may further include at least one of: access control information; and roaming information.

Another embodiment of the present application provides a method. The method may include: receiving an onboarding request for a user equipment (UE) indicating an identity of the UE and an onboarding and provisioning function (OPF) identity; and transmitting a first onboarding request at least indicating the identity of the UE to a first OPF entity identified by the OPF identity in the case of onboarding and provisioning services for the UE not being supported.

In an embodiment of the present application, the method may further include receiving a first onboarding response indicating onboarding and provisioning services for the UE can be supported by the first OPF entity.

In an embodiment of the present application, the method may further include receiving a first onboarding response indicating onboarding and provisioning services for the UE cannot be supported by the first OPF entity.

In an embodiment of the present application, the first onboarding response further indicates an additional OPF identity; and the method comprises: transmitting a second onboarding request including the identity of the UE to a second OPF entity identified by the additional OPF identity.

In an embodiment of the present application, the method may further include receiving a second onboarding response, indicating that onboarding and provisioning services for the UE can be supported by the second OPF entity.

In an embodiment of the present application, the method may further include transmitting a provisioning request; and receiving provisioning data.

In an embodiment of the present application, the provisioning data includes at least one of: an indication whether the UE needs to sends an acknowledgement when receiving the provisioning data successfully; and subscription data including: subscriber identity; credential; and home network identity. The subscription data further includes at least one of: access control information; and roaming information.

In an embodiment of the present application, the method may further include receiving a second onboarding response indicating that onboarding and provisioning services for the UE cannot be supported by the second OPF entity.

In an embodiment of the present application, the method may further include transmitting an onboarding response indicating that onboarding and provisioning services for the UE cannot be supported.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

Embodiments of the present application can provide onboarding and provisioning services for a SNPN UE with low complexity and guaranteed security.

BRIEF DESCRIPTION OF TUE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G. It is contemplated that along with developments of network architectures and new service scenarios, all embodiments in the present application are also applicable to similar technical problems; and moreover, the terminologies recited in the present application may change, which should not affect the principle of the present application.

Figure 1:
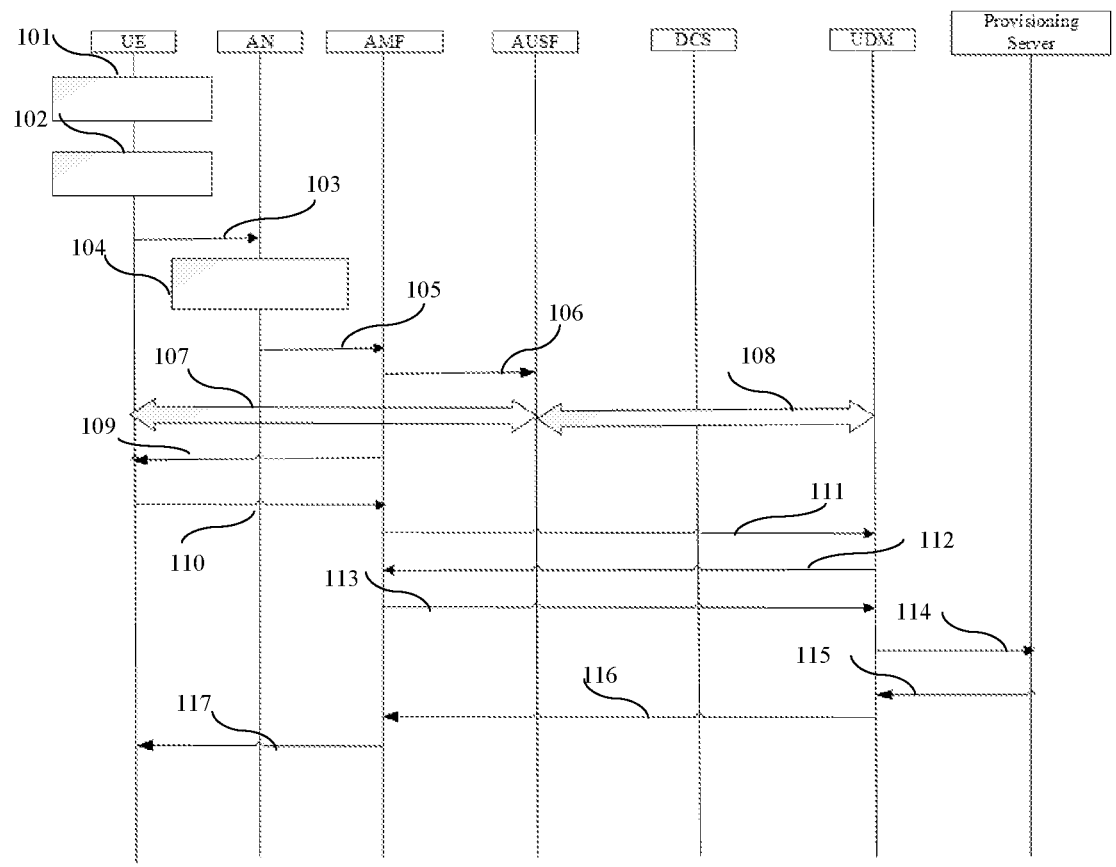
FIG. 1 is a flow chart illustrating a method for providing remote onboarding and provisioning services for a SNPN UE by a default credential sever (DCS) and a provisioning server.

FIG. 1 is a flow chart illustrating a method for providing onboarding and provisioning services for a SNPN UE by a default credential sever (DCS) and a provisioning server.

Specifically, in FIG. 1, an onboarding and provisioning procedure (also referred to as "onboarding procedure" or "provisioning procedure") is exemplarily illustrated among a UE, an onboarding SNPN including an access network (AN), an access and mobility management function (AMF), an authentication server function (AUSF), and a unified data management (UDM), a DCS, and a provisioning server.

The UE in FIG. 1 is a SNPN UE, and has no USIM or eSIM inside. The LTE may include a computing device, such as a desktop computer, a laptop computer, a personal digital assistant (PDA), a tablet computer, a smart television (e.g., television connected to the Internet), a set-top box, a game console, a security system (including a security camera), a vehicle on-board computer, a network device (e.g., a router, a switch, and a modem), or the like. According to an embodiment of the present disclosure, the UE may include a portable wireless communication device, a smart phone, a cellular telephone, a flip phone, a device having a subscriber identity, module, a personal computer, a selective call receiver, or any other device that is capable of sending and receiving communication signals on a wireless network. In some embodiments, the UE may include a wearable device, such as a smart watch, a fitness band, an optical head-mounted display, or the like. Moreover, the UE may be referred to as a subscriber unit, a mobile phone, a mobile station, a user, a terminal, a mobile terminal, a wireless terminal, a fixed terminal, a subscriber station, a user terminal, or any device described using other terminology used in the art.

In some embodiments, e.g., the embodiment shown in FIG. 1, the UE is pre-configured with default credentials (e.g. including a digital certificate) that identify the vendor or manufacturer of the UE i.e. the device vendor. Since the digital certificate is not used to identify the UE, the digital certificate does not need to be different for every UE. Each UE is assumed to be uniquely identifiable with a unique identifier, such as a host identity (ID) or a medium access control (MAC) address. Alternatively, each UE may be required to be provisioned with a different unique UE certificate, and a UE can be identified by a unique UE certificate.

The AN may be configured to provide a network access service for the UE, An AN entity may also be referred to as radio access network (RAN) entity, an access point, an access terminal, a base, a macro cell, a Node-B, an enhanced Node B (eNB), a gNB, a home Node-B, a relay node, or any device described using other terminology used in the art.

The AMF, the AUSF, and the UDM are network function entities of a 5G core network. In particular, the AMF is a network function entity used for receiving all the connection and session information from a UE or the AN and handling connection and mobility management tasks. The AUSF is a network function entity used for authentication. The UDM is a network function entity used for managing network user data in a single, centralized element.

In some embodiments, e.g., the embodiment shown in FIG. 1, the DCS is able to authenticate a vendor or manufacturer of the UE (i.e. device vendor) and authorize the UE to proceed with an onboarding procedure. The provisioning server is also administered by a subscription owner (SO), e.g. the SNPN or a delegated administration entity, which is able to provide the configuration parameters of the SO to the UE.

The DCS is provisioned with the certificate path of the device vendor, as well as the unique identifier (e.g., host ID or MAC address) of the UE, which are used to authorize the UE to perform the onboarding procedure. In another embodiment, if a UE-specific default credential (the credential is unique to each UE) is used, the DCS is provisioned with the UE-specific credential of the UE that is used to authorize the UE to perform the onboarding procedure. The UDM of an onboarding network (ON) is also provisioned with the SUPIs of the UEs to be used for the onboarding procedure, and is not authorized to establish any protocol data unit (PDU) session.

The provisioning server is provisioned with the subscription data that needs to be configured to the UE.

Now referring to FIG. 1, in step 101, the UE receives a trigger for initiating an onboarding procedure. The trigger may be manual, for example provoked by a user pressing a given combination of keys, or can be automatically provoked, e.g., due to the UE switching on and not being previously provisioned.

In step 102, the UE performs network selection to select a network to establish connection. A user may select a network from a list of available networks manually. Alternatively, the network selection can be performed automatically, e.g., when the UE is provisioned with a list of PLMN IDs and NIDs for connections.

In step 103, the UE transmits a registration request to the AN. The registration request may include a registration type "onboarding," the SUPI of the LE for onboarding, and a permanent equipment identifier (PEI). The registration type "onboarding" indicates that the UE wants to perform an onboarding procedure. The SUN may be derived from any of the host ID of the UE, the MAC address of the UE, or subject field in a digital certificate of the UE.

After receiving the registration request, in step 104, the AN selects a default AMF which can serve the onboarding procedure.

In step 105, the AN transmits a N2 message including N2 parameters and the registration request to the selected default AMF. The N2 parameters include the PLMN ID, the NID, location information and cell identity related to the cell in which the UE is camping, and a UE context request which indicates that a UE context including security information needs to be setup at a next generation-radio access network (NG-RAN) when the NG-RAN is used.

In step 106, based on the received N2 message, the AMF transmits an authentication request to a selected AUSF. For example, the selected AUSF is a default AUSF or an AUSF selected based on the unique identifier of the UE.

In step 107 and step 108, the AUSF authenticates the supplied SIM of the UE for onboarding. That is, an onboarding authentication and authorization procedure will be performed. This may require additional interaction between the AUSF and the UE, e.g., to request the UE to supply a vendor certificate or a UE certificate. Depending on the supplied SUM and an authentication mechanism, the AUSF may also need to contact the DCS and/or the UDM for authentication.

After the onboarding authentication and authorization is achieved, in step 109 and step 110, the AMF and the UE initiate a non-access stratum (NAS) security mode command procedure. For example, the AMF sends a NAS security mode command to the UE in step 109, and the UE sends a feedback indicating the NAS security mode command is completed in step 110.

In step 111, the AMF registers the SUN of the UE for onboarding with the UDM, for example by sending a Nudm_UECM-Registration request.

In step 112, the UDM verifies that the SUN of the UE is authorized to proceed with the onboarding procedure, and transmits the verified result to the AMF, for example by sending a Nudm_UECM-Registration response.

In step 113, the AMF requests the UDM for configuration subscription data corresponding to the SUPI of the UE. The configuration subscription data further includes an indication on whether the UE needs to send an ACID: to the UDM and a positive indication that the UE needs to re-register after updating its subscription data.

In step 114, the UDM requests to retrieve the configuration subscription data for the UE from the provisioning server, for example, by transmitting a Get UE configuration request to the provisioning server.

In step 115, in response to the request from the UDM, the provisioning server indicates the configuration subscription data for the UE to the UDM, for example, by transmitting a Get UE configuration response including the configuration subscription data for the UE.

After retrieving the configuration subscription data for the LE, the UDM transfers the configuration subscription data for the UE to the AMF in step 116.

After receiving the configuration subscription data for the UE, the AMF transmits a registration accept message to the UE in step 117.

In the embodiment shown in FIG. 1, three parties, i.e., the onboarding SNPN, the DCS and the provisioning server, are involved, which brings complexity and extra cost for establishing or maintaining the trust relationship between each other, and also brings complexity for the 3GPP architecture due to introducing more new interfaces. Furthermore, when the DCS and the provisioning server belong to different domains, there is a potential security issue that the provisioning server cannot trust the authentication result from the DCS without further authentication.

In addition, there is another solution for an embedded universal integrated circuit card (eUICC) remote provisioning, which is specified in groupe speciale mobile association (GSMA), and is out scope of 3GPP. However, in a SNPN scenario, the SNPN UE has no SIM, eUICC, or eSIM. Thus, the eUICC remote provisioning cannot be reused.

In the embodiments of the present application, a new 3GPP function, onboarding and provision function (OPF) for providing onboarding and provisioning services for the SNPN UE is introduced. The OPF (or OPF entity) can at least realize the following functions, including: storing provisioning data (e.g., full subscription data for the UE), default configurations (including an identity of the UE (or called UE identity), default credentials, default OPF identity, an optional list of onboarding networks, and an optional vendor certificate), an additional OPF identity which can provide the provisioning data for specific UE or group of UEs if required; distributing the provisioning data; and onboarding authentication and authorization. The onboarding and provisioning services for the UE may mainly include two aspects, that is, onboarding the network and obtaining the provisioning data.

Figure 2:
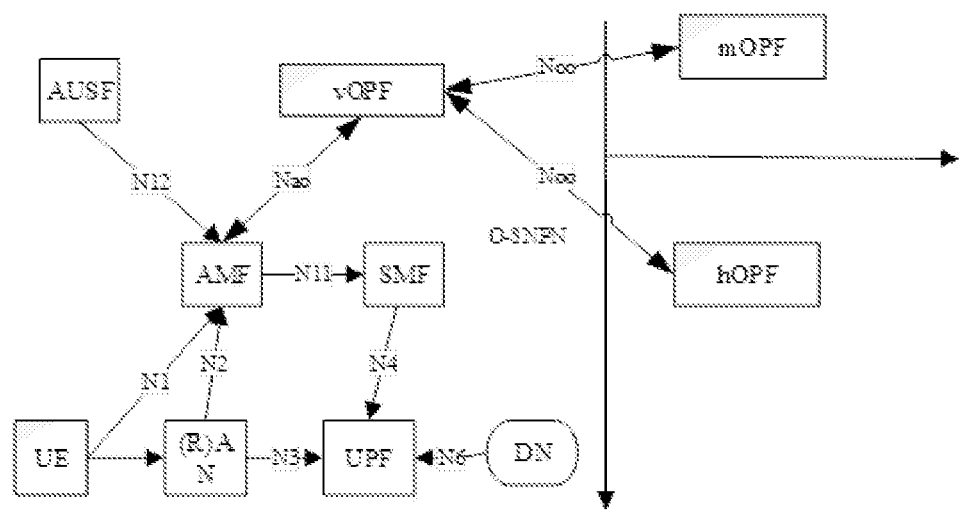
FIG. 2 illustrates a schematic network architecture diagram for onboarding and provisioning for a UE in accordance with some embodiments of the present application.
Figure 3:
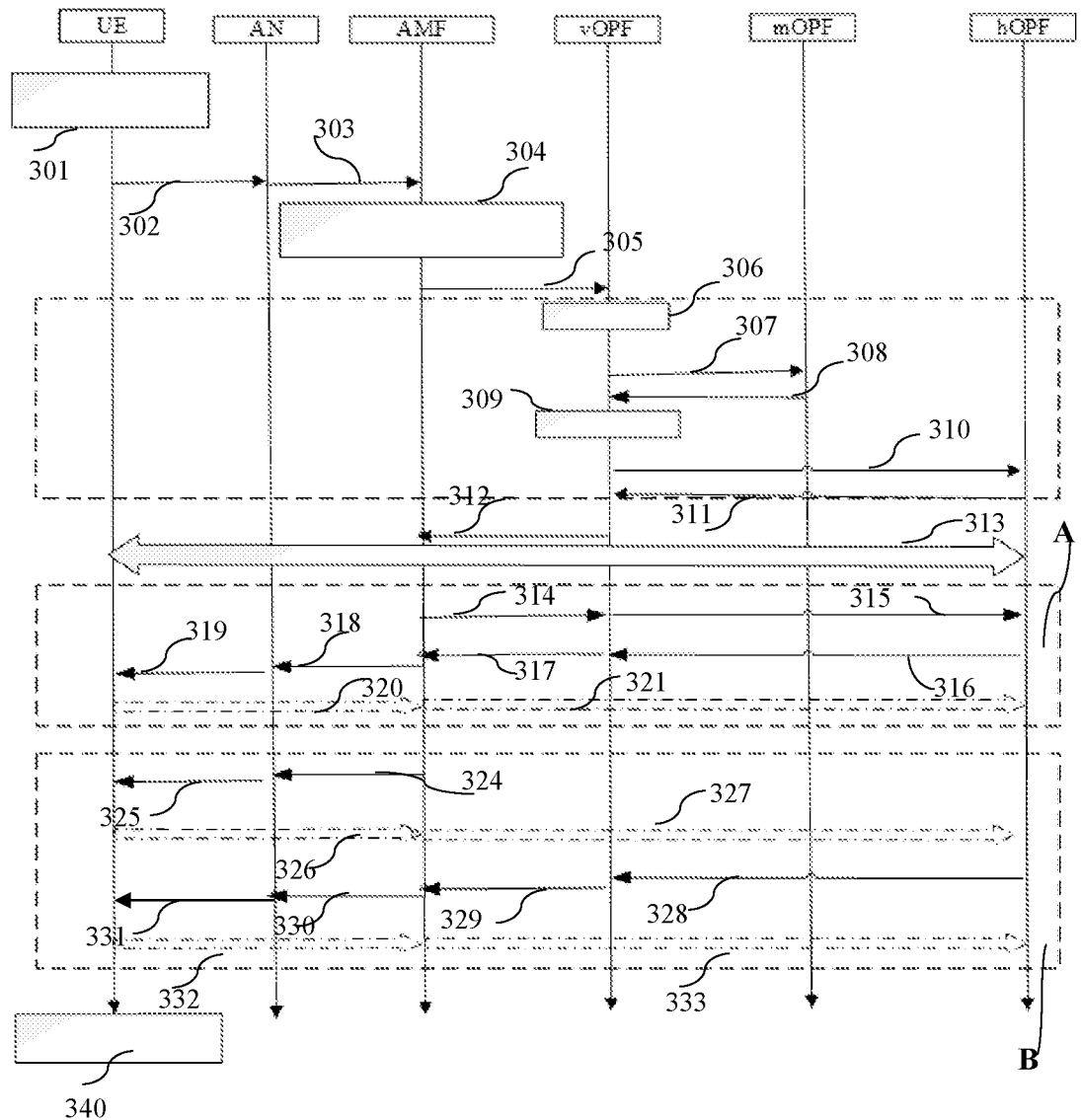
FIG. 3 is a flow chart illustrating a method for providing onboarding and provisioning services for a SNPN UE by using OPF(s) according to some embodiments of the present application.

FIG. 2 illustrates a schematic network architecture diagram for onboarding and provisioning for a UE in accordance with some embodiments of the present application. FIG. 3 is a flow chart illustrating a method for providing onboarding and provisioning services for a UE by using OPF according to some embodiments of the present application. The UE can be a SNPN UE.

As shown in FIG. 2, within the onboarding-SNPN (O-SNPN), a UE, a (R)AN, an AMF, a session management function (SMF), an AUSF, a user plane function (UPF), a data network (DN), and a visited OPF entity (vOPF) are exemplarily shown. While, outside the O-SNPN, a manufactory OPF entity (mOPF) and a home OPF entity (hOPF) are exemplarily shown, which are connected with the vOPF. It should be understood that the mOPF and the hOPF are outside the O-SNPN is just an example of the present application; the mOPF and/or the hOPF may be inside the O-SNPN in some other examples. The above network elements in FIG. 2 are connected with each other via corresponding interfaces, for example, N1, N2, N3, N4, N6, N11, N12, Nao, and Noo. Wherein the Nao and Noo interfaces in FIG. 2 are newly introduced in the some embodiments of the present application, while will develop with the 5G technology.

The vOPF indicates an OPF entity selected and visited by the AMF in the O-SNPN. The vOPF has the capability to discover OPF(s) by using an OPF identity, which may be provided by the UE. The mOPF indicates an OPF entity associated with the manufactory of the UE. The mOPF can provide an additional OPF identity in addition to itself that can provide the provisioning data for the UE, when the mOPF cannot provide the onboarding and provisioning services for the UE.

A service agreement for the onboarding and provisioning services is made between the O-SNPN and the home operator or the manufactory of the UE. The manufactory of the LTE stores the default configuration for the UE. In particular, the default configuration for the UE may include: UE identity (e.g., device ID, PEI, international mobile equipment identity (IMEI), SUPI, or MAC address); default credentials used for network registration and onboarding authentication; default OPF identity where the provisioning data may be stored. The default OPF may be the mOPF for the UE, or the OPF entity of the buyer of the UE in the case that the buyer customized the UE, etc. For example, in some embodiments of the present application, the default OPF can be the hOPF, wherein the identity of the default OPF is the identity of the hOPF; in some other embodiments of the present application, the default OPF can be the vOPF, wherein the identity of the default OPF is the identity of the vOPF. Optically, the default configuration may further include a vendor certificate used for the O-SNPN to determine whether the UE of the vendor is allowed for onboarding and provisioning services; and a list of onboarding networks for the IX to select for onboarding and provisioning.

The hOPF indicates a home operator (or called a SNPN operator) for a UE who owns the subscription data of the UE. The hOPF may obtain and store the default configuration for the UE and the subscription data. For example, the default configuration can be downloaded from the mOPF, by the hOPF for example, by using a user name or a password, device ID, mOPF address provided in the product specification document of the UE. In some other embodiments of the present application, the default configuration may be obtained by the hOPF by using a memory device (e.g., a flash disk) to get the default configuration for the hOPF.

Although the vOPF, the mOPF, and the hOPF are illustrated as different OPF entities in FIG. 2 and FIG. 3, it should be understood that the vOPF and the mOPF may be the same OPF in some cases, the vOPF and the hOPF may be the same OPF in some other cases, and the vOPF, the mOPF, and the hOPF may be the same OPF in some other cases. Accordingly, the corresponding procedure will be greatly simplified.

The UE in FIGS. 2 and 3 is a SNPN UE with no USIM or eSIM inside. The UE may be pre-configured with the default configuration as above mentioned.

The (R)AN is used to provide network access service for the UE. The AMF, the AUSF, and the SMF, the UM the DN are network function entities of a 5G core network. In particular, the AMF is a network function entity used for receiving all the NAS signaling from the UE or the (R)AN, and handling access and mobility management tasks. The AUSF is a network function entity used for authentication. The SMF is a network function entity used for interacting with the decoupled data plane, creating, updating and removing PDU sessions and managing session context with user plane function (UPF). The UPF is a network function entity for packet routing and forwarding, packet inspection, QoS handling, acting as external PDU session point of interconnect to the DN. The DN is a network function for operator services, Internet access or other services.

Now, we will describe the method for providing onboarding and provisioning services for a SNPN UE by using OPF(s) according to some embodiments of the present application in connection with FIG. 3.

As shown in FIG. 3, in step 301, for example, when the UE switches on while detecting no subscription data, the UE will trigger to initiate a registration request for onboarding and provisioning services. As discussed above, the UE has pre-configured with the default configuration. The default configuration may include: UE identity (e.g., device ID, PEI, MEL SUFI, or MAC address), default credentials, default OPF identity. Optionally, the default configuration may further include at least one of: a vendor certificate, and a list of onboarding networks for the UE to select for onboarding and provisioning.

In step 302, the UE initiates the registration request and transmits it to the (R)AN. The registration request may include the UE identity, an onboarding and provisioning flag, and the default OPF identity. Optionally, the registration request may further include the vendor certificate.

After receiving the registration request, the (R)AN selects a default or a pre-configured AMF supporting the onboarding and provisioning services, and transmits the registration request to the AMF in step 303.

After receiving the registration request, in response to the onboarding and provisioning flag, the AMF determines whether an onboarding request can be supported for the UE, for example, at least based on the following considerations: whether the O-SNPN has a capability to provide the onboarding and provisioning services; and whether the UE or the vendor of the UE is allowed for the onboarding and provisioning services based on the local policy of the O-SNPN and/or the vendor certificate.

When the onboarding request can be supported based on the considerations, in step 304, the AMF further performs OPF selection to try to find an OPF entity that can provide the onboarding and provisioning services for the UE based on the default OPF identity included in the registration request. Otherwise, when the onboarding request cannot be supported based on the considerations, the AMF rejects the registration request with a cause indicating the rejection reasons (which is not shown in FIG. 3).

When the AMF finds the OPF entity which can provide the onboarding and provisioning services for the UE based on the default OPF identity, in step 305, the AMF transmits an onboarding request at least including the UE identity to the found OPF entity. In step 305 of FIG. 3, transmitting an onboarding request to the vOPF is shown, it should be understood that, in this case, the found Off entity is the vOPF, and the vOPF is the hOPF who owns the subscription data. And then, steps 306-311 are skipped, and step 312 is performed. In step 312, the vOPF transmits an onboarding response indicating there is an OPF that can provide the onboarding and provisioning services for the UE to the AMF.

When the AMF cannot find the OPF entity which can provide the onboarding and provisioning services for the UE based on the default OPF identity, the AMF selects a configured OPF entity (e.g., the vOPF). For example, the configured OPF entity may be an OPF which at the next hop of the AMF in a routing table. In step 305; the AMF transmits an onboarding request including the UE identity and the default OPF identity to the vOPF. An OPF entity selection procedure, which may include steps 306-311 can be performed by the vOPF to find an OPF entity that can provide the onboarding and provisioning services for the UE.

After receiving the onboarding request, in step 306, the vOPF performs OPF selection to try to find an OPF entity that can provide the onboarding and provisioning services for the UE based on the default OPF identity included in the onboarding request.

When the vOPF finds the OPF entity that can provide the onboarding and provisioning services for the UE based on the default OPF identity, in step 307, the vOPF transmits the onboarding request including the UE identity to the found OPF entity corresponding to the default OPF identity. As shown in FIG. 3, in this case, the found OPF entity is the mOPF.

Otherwise, when the vOPF fails to find an OPF entity corresponding to the default OPF identity, it feedbacks the AMF that there is no OPF entity found (which is not shown in FIG. 3).

After receiving the onboarding request, in step 308, the mOPF transmits an onboarding response to the vOPF, and the onboarding response indicates whether the mOPF can provide the onboarding and provisioning services for the UE. When the mOPF can provide the onboarding and provisioning services for the UE, in step 308, a positive indication is included in an onboarding response and transmitted to the vOPF. Accordingly, steps 309-311 are skipped, and step 312 is performed. In step 312, the vOPF transmits an onboarding response indicating there is an OPF entity that can provide the onboarding and provisioning services for the UE to the AMF. In this case, the mOPF is also the home operator (hOPF) who owns the subscription data. That is, the mOPF and the hOPF is the same OPF.

Otherwise, when the mOPF cannot provide the onboarding and provisioning services for the UE, in step 308, a negative indication is included in the onboarding response and transmitted to the vOPF. However, the mOPF may provide an additional OPF identity of an OPF entity that may provide the onboarding and provisioning services for the UE. The additional OPF identity can be included in the onboarding response and transmitted to the vOPF, and then the following steps 309-311 will be performed. Alternatively, when there is no additional OPF entity provided by the mOPF, the following steps 309-311 will be skipped, and step 312 will be performed. In step 312, the vOPF transmits an onboarding response to the AMF, indicating that there is no OPF entity that can provide the onboarding and provisioning services for the UE.

When receiving the onboarding response including the negative indication and the additional Off identity, in step 309, the vOPF performs OPF selection again to try to find an OPF entity that can provide the onboarding and provisioning services for the UE based on the additional OPF identity included in the onboarding response.

When the vOPF finds the OPF entity that can provide the onboarding and provisioning services for the UE based on the additional OPF identity, in step 310, the vOPF transmits an onboarding request including the UE identity to the found OPF entity corresponding to the additional OPF identity. As shown in FIG. 3, in this case, the found OPF entity is the hOPF.

Otherwise, when the vOPF fails to find an OPF entity corresponding to the additional OPF identity, the vOPF responds the AMF that there is no OPF entity found (which is not shown in FIG. 3).

After receiving the onboarding request, in step 311, the hOPF transmits an onboarding response to the vOPF, and the onboarding response indicates whether the hOPF can provide the onboarding and provisioning services for the UE. When the hOPF can provide the onboarding and provisioning services for the UE, in step 311, a positive indication is included in the onboarding response and transmitted to the vOPF. That is, in this case, the hOPF owns the subscription data.

Otherwise, when the hOPF cannot provide the onboarding and provisioning services for the UE, in step 311, a negative indication is included in the onboarding response and transmitted to the vOPF. However, the hOPF may provide another additional OPF identity of an OPF entity that may provide onboarding and provisioning services for the UE, which may be also included in the onboarding response and transmitted to the vOPF. Steps similar to steps 309-311 will be performed again. Alternatively, when there is no another additional OPF identity provided by the hOPF, step 312 will be performed. In step 312, the vOPF transmits an onboarding response to the AMF, indicating that there is no OPF entity that can provide the onboarding and provisioning services for the UE.

After receiving the onboarding response indicating there is an OPF entity that can provide the onboarding and provisioning services for the UE, in step 313, an onboarding authentication and authorization procedure will be performed mainly among the UE, the AMF and the OPF entity that can provide the onboarding and provisioning services for the UE. In particular, the AMF may transmit an onboarding authentication request to the OPF entity that can provide the onboarding and provisioning services for the UE, and exchange messages for the onboarding authentication and authorization between the UE and the OPF entity.

After completing the onboarding authentication and authorization, an indication of the onboarding authentication result will be transmitted to the OPF entity that can provide the onboarding and provisioning services for the UE. After the onboarding authentication result is received, a provisioning procedure will be performed.

The provisioning procedure as shown in FIG. 3 is described, by taking an example that the hOPF is the found OPF entity that can provide the onboarding and provisioning services for the UE.

As shown in FIG. 3, for the provisioning procedure, steps 314-321 in the dotted box indicated by A may be performed in an embodiment, or steps 324-333 in the dotted box indicated by B may be performed in another embodiment. The steps 314-321 in the dotted box indicated by A is the steps in the provisioning procedure based on AMF request, and the steps 324-333 in the dotted box indicated by B is the steps in the provisioning procedure based on OPF notification.

For the provisioning procedure based on AMF request, in step 314 and step 315, the AMF transmits a provisioning request including the UE entity to the hOPF via the vOPF.

In step 316 and step 317, the hOPF transmits a provisioning response including provisioning data to the AMF. The provisioning data may include an indication on whether the UE needs to send an acknowledgement to the hOPF when receiving the provisioning data successfully; and subscription data that is transparent to NAS layer and can be a container. In particular, the subscription data may be a list of subscriber data specified in 3GPP TS 23.122. The list of subscriber data contains zero or more entries. Each entry of the list of subscriber data may include a subscriber identifier in the form of a SUFI containing a network-specific identifier; credentials; home network identity (that is, SNPN identity); and optionally, access control information, for example, the unified access control configuration indicating for which access identities (see 3GPP TS 24.501 [64]) the ME is configured in the SNPN, and roaming information.

In step 318 and step 319, the AMF transmits a registration accept message including the provisioning data to the UE via the (R)AN.

Optionally; when the provisioning data includes an indication that the UE needs to send an acknowledgement to the hOPF when receiving the provisioning data successfully, in step 320 and step 321; the UE may transmit an acknowledgement to hOPF via the AMF. And then, in step 340, the UE may perform network re-selection or re-registration with the received subscription data.

On the other hand, for the provisioning procedure based on OPF notification, in step 324 and step 325, the AMF transmits a registration accept message to the UE, without the provisioning data.

Optionally, in step 326 and step 327, the UE may transmit an acknowledgement to hOPF in the case of being requested.

In step 328 and step 329, the hOPF transmits a provisioning notification to the AMF via the vOPF, after the onboarding authentication and authorization of the UE is completed successfully. The provisioning notification includes provisioning data that contains an indication whether the UE needs to transmit an acknowledgement to the hOPF when receiving the provisioning data successfully, and the subscription data as mentioned above.

In step 330 and step 331, the AMF transmits the provisioning data to the UE via the (R)AN by using downlink NAS transport.

Optionally, when the provisioning data includes the indication that the UE needs to send an acknowledgement to the hOPF when receiving the provisioning data successfully, in step 332, the UE may transmit an acknowledgement to the AMF via (R)AN, by uplink NAS transport. And then, after receiving the acknowledgement, in step 333, the AMF transmits the provisioning information to the hOPF. And then, in step 340, the UE may perform network re-selection or re-registration with the received subscription data.

Figure 4:
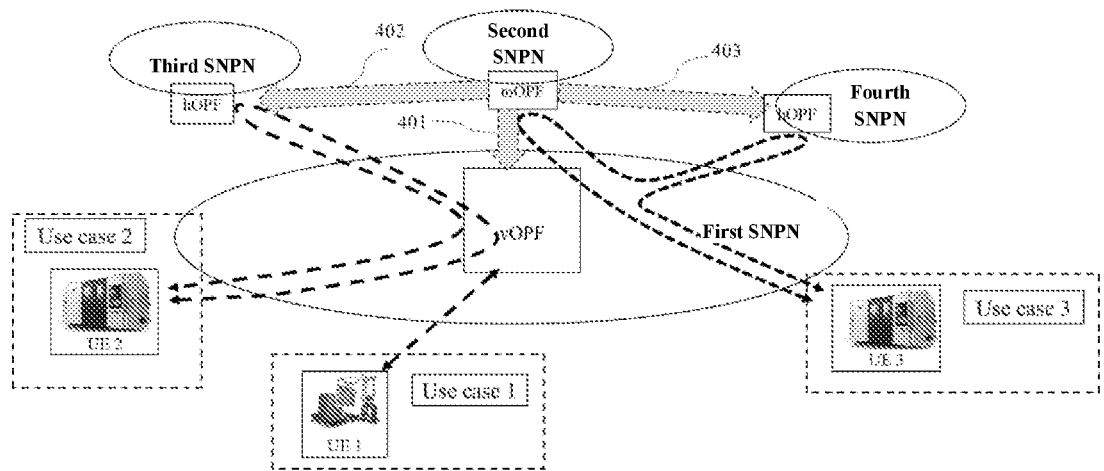
FIG. 4 is a schematic diagram illustrating three examples of use cases for providing onboarding and provisioning service according to some embodiments of the present application.

FIG. 4 is a schematic diagram illustrating three exemplary scenarios of use cases for providing onboarding and provisioning service according to some embodiments of the present application.

For use case 1, the manufactory of UE 1 is manufactory S. The OPF (represented as mOPF in FIG. 4) in the SNPN of the manufactory S (represented as a second SNPN) deliveries default configuration of UE 1 to a first SNPN, as indicated by 401, in advance. The first OPF stores the default configuration including UE 1 identity, and subscription data for UE 1, and so on. UE 1 is pre-configured with the default configuration including UE 1 identity and the first OPF identity, and so on.

When UE 1 performs an onboarding and provisioning procedure, UE 1 selects to access the first SNPN, and transmits its UE identity and a first OPF identity to a first OPF in the first SNPN. In this use case, the first OPF (represented as vOPF in FIG. 4) is also a hOPF that can provide the subscription data to UE 1. Therefore, UE 1 can get the subscription data from the first OPF.

For use case 2, the manufactory of UE 2 is also the manufactory S. The OPF (represented as mOPF in FIG. 4) in the second SNPN deliveries default configuration of UE 2 to a third SNPN, as indicated by 402, in advance. The third OPF stores the default configuration including UE 2 identity; and subscription data for UE 2, and so on. UE 2 is pre-configured with the default configuration including UE 2 identity and a third OPF identity, and so on.

When UE 2 performs an onboarding and provisioning procedure, UE 2 selects to access the first SNPN, and transmits its UE identity and the third OPF entity to the first OPF in the first SNPN. In this use case, the first OPF (represented as vOPF in FIG. 4) cannot provide the onboarding and provisioning services, but discovers that the third OPF (represented as hOPF in FIG. 4) can provide the services, and get the subscription data of UE 2 from the third OPF.

For use case 3, the manufactory of UE 3 is also the manufactory S. The OPF (represented as mOPF in FIG. 4) in the second SNPN deliveries default configuration of UE 3 to a fourth SNPN, as indicated by 403, in advance. The fourth OPF stores the default configuration including UE 3 identity, and subscription data for UE 3, and so on. UE 3 is pre-configured with the default configuration including UE 3 identity and the second OPF identity, and so on.

When UE 3 performs an onboarding and provisioning procedure, UE 3 selects to access the first SNPN, and transmits its UE identity and the second OPF entity to the first OPF in the first SNPN. In this use case, the first Off' (represented as vOPF in FIG. 4) cannot provide the onboarding and provisioning services. The first OPF discovers the second OPF (the mOPF) by the OPF identity provided by UE 3. Although the second OPF cannot provide the services, it provides a fourth OPF identity to the first OPF. And then the first OPF discovers that the fourth OPF (represented as hOPF in FIG. 4) can provide the services, and finally get the subscription data of UE 3 from the fourth OPF.

Therefore, through the above described embodiments of the present application, it is possible to provide onboarding and provisioning services for a SNPN with low complexity and guaranteed security.

Figure 5:
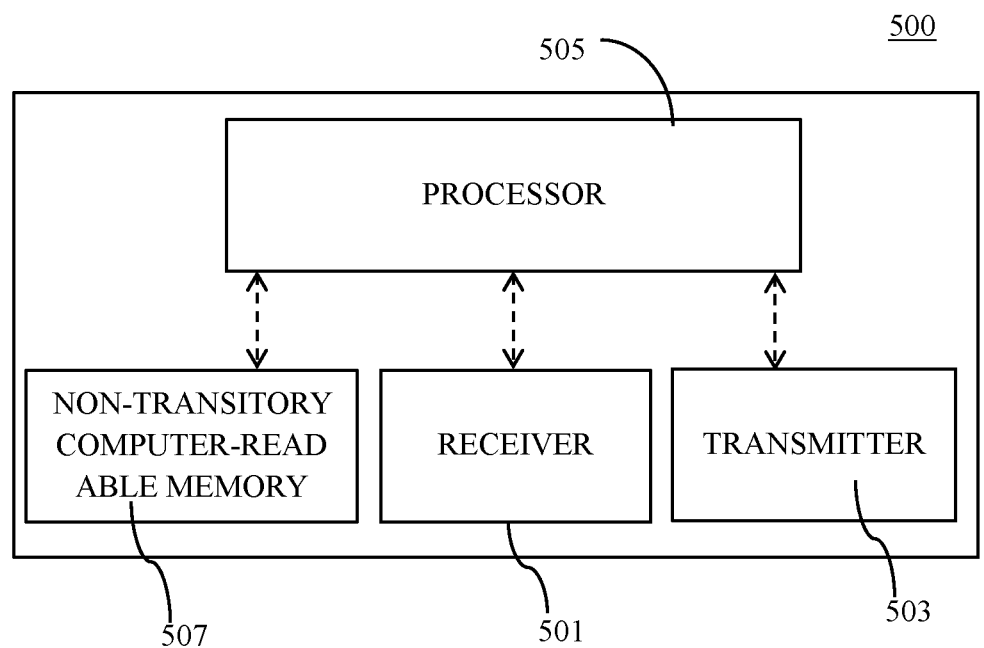
FIG. 5 illustrates an apparatus according to some embodiments of the present application.

FIG. 5 illustrates an apparatus according to some embodiments of the present application. In some embodiments of the present disclosure, the apparatus 500 may be the UE illustrated in the above embodiments of the present application.

As shown in FIG. 5, the apparatus 500 may include a receiver 501, a transmitter 503, a processor 505, and a non-transitory computer-readable medium 507. The non-transitory computer-readable medium 507 has computer executable instructions stored therein. The processer 505 is configured to be coupled to the non-transitory computer readable medium 507, the receiver 501, and the transmitter 503. It is contemplated that the apparatus 500 may include more computer-readable mediums, receiver, transmitter and processors in some other embodiments of the present application according to practical requirements. In some embodiments of the present application, the receiver 501 and the transmitter 503 are integrated into a single device, such as a transceiver. In certain embodiments, the apparatus 500 may further include an input device, a memory, and/or other components.

In some embodiments of the present application, the non-transitory computer-readable medium 507 may have stored thereon computer-executable instructions to cause a processor to implement the processes performed by the UE in the above methods according to embodiments of the present application.

Figure 6:
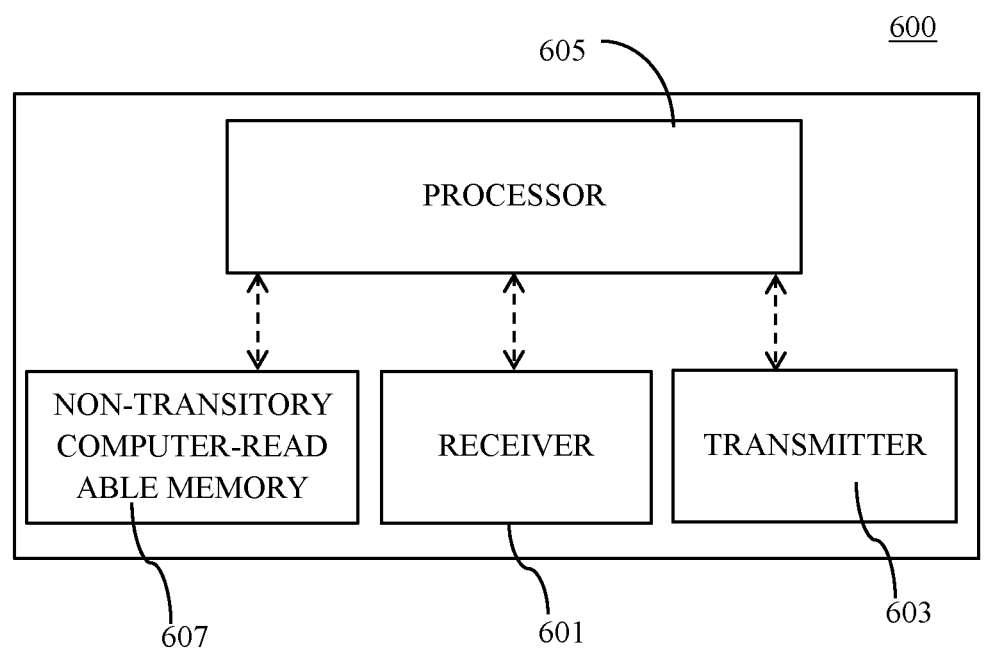
FIG. 6 illustrates an apparatus according to some other embodiments of the present application.

FIG. 6 illustrates an apparatus according to some other embodiments of the present application. In some embodiments of the present disclosure, the apparatus 600 may be the AMF illustrated in the above embodiments of the present application.

As shown in FIG. 6, the apparatus 600 may include a receiver 601, a transmitter 603, a processor 605, and a non-transitory computer-readable medium 607. The non-transitory computer-readable medium 607 has computer executable instructions stored therein. The processer 605 is configured to be coupled to the non-transitory computer readable medium 607, the receiver 601, and the transmitter 603. It is contemplated that the apparatus 600 may include more computer-readable mediums, receiver, transmitter and processors in some other embodiments of the present application according to practical requirements. In some embodiments of the present application, the receiver 601 and the transmitter 603 are integrated into a single device, such as a transceiver. In certain embodiments, the apparatus 600 may further include an input device, a memory, and/or other components.

In some embodiments of the present application, the non-transitory computer-readable medium 607 may have stored thereon computer-executable instructions to cause a processor to implement the processes performed by the AMY in the above methods according to embodiments of the present application.

Figure 7:
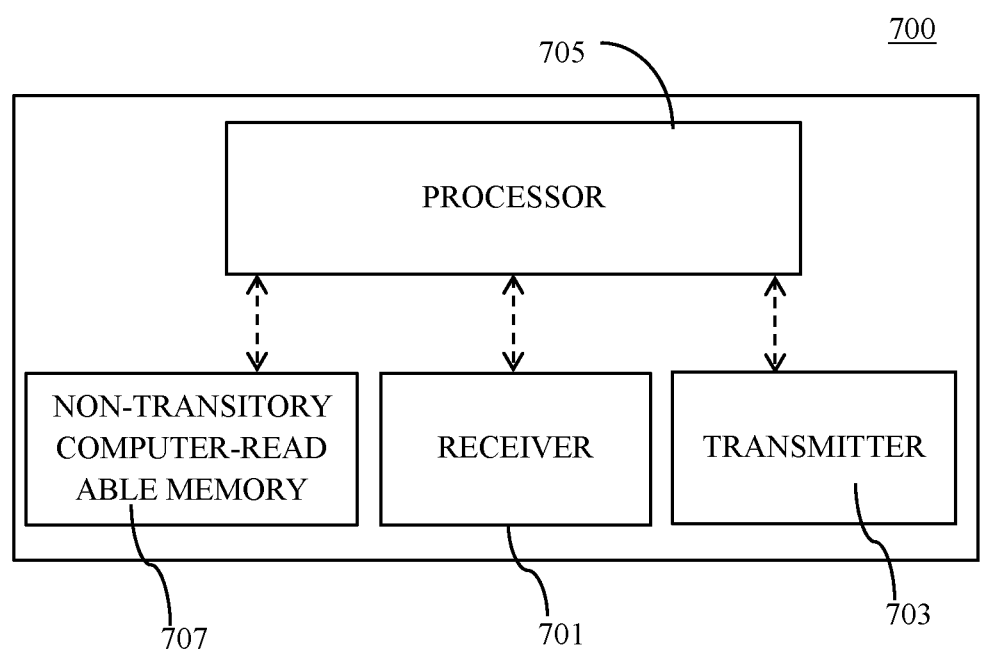
FIG. 7 illustrates an apparatus according to some other embodiments of present application.

FIG. 7 illustrates an apparatus according to some embodiments of the present application. In some embodiments of the present disclosure, the apparatus 700 may be the OPF (the vOPF, the mOPF, or the hOPF) illustrated in the above embodiments of the present application.

As shown in FIG. 7, the apparatus 700 may include a receiver 701, a transmitter 703, a processer 505, and a non-transitory computer-readable medium 707. The non-transitory computer-readable medium 707 has computer executable instructions stored therein. The processer 705 is configured to be coupled to the non-transitory computer readable medium 707, the receiver 701, and the transmitter 703. It is contemplated that the apparatus 700 may include more computer-readable mediums, receiver, transmitter and processors in some other embodiments of the present application according to practical requirements. In some embodiments of the present application, the receiver 701 and the transmitter 703 are integrated into a single device, such as a transceiver. In certain embodiments, the apparatus 700 may further include an input device, a memory, and/or other components.

In some embodiments of the present application, the non-transitory computer-readable medium 707 may have stored thereon computer-executable instructions to cause a processor to implement the processes performed by the Off (the vOPF, the mOPF, or the hOPF) in the above methods according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A network equipment (NE) for wireless communication, comprising:
  at least one memory; and
  at least one processor coupled with the at least one memory and configured to cause the NE to:
    receive a registration request for a user equipment (UE), wherein the registration request indicates an identity of the UE, an onboarding and provisioning flag, and an onboarding and provisioning function (OPF) identity;
    select an OPF entity at least based on the OPF identity;
    determine whether an onboarding request is supported for the UE based at least in part on a capability of supporting onboarding and provisioning of a non-public network; and
    transmit the onboarding request at least indicating the identity of the UE to the selected OPF entity.

2. The NE of claim 1, wherein the at least one processor is configured to cause the NE to receive an onboarding response, indicating whether onboarding and provisioning services for the UE are supported.

3. The NE of claim 2, wherein the at least one processor is configured to cause the NE to:
  transmit a provisioning request indicating the identity of the UE if the onboarding response indicates that the onboarding and provisioning services for the UE is supported; and
  receive a provisioning response including provisioning data.

4. The NE of claim 3, wherein the at least one processor is configured to cause the NE to transmit a registration acceptance message including the provisioning data if the onboarding response indicates that the onboarding and provisioning services for the UE is supported.

5. The NE of claim 3, wherein the provisioning data includes at least one of an indication whether the UE is to send an acknowledgement when receiving the provisioning data successfully, or subscription data including a subscriber identity, a credential, and a home network identity.

6. The NE of claim 1, wherein the registration request comprises a vendor certificate, and wherein the at least one processor is configured to cause the NE to determine whether the onboarding request is supported for the UE based on at least one of the vendor certificate or a local policy of the non-public network.

7. The NE of claim 1, wherein:
  the selected OPF entity comprises a first OPF entity identified by the OPF identity if the first OPF entity identified by the OPF identity is found; or
  the selected OPF entity comprises a configured OPF entity if the first OPF entity identified by the OPF identity is not found.

8. The NE of claim 7, wherein the onboarding request further indicates the OPF identity.

9. An apparatus, comprising:
  at least one memory having executable instructions stored therein;
  at least one processor coupled with the at least one memory, wherein the executable instructions are programmed to:
    receive an onboarding request for a user equipment (UE) indicating an identity of the UE;
    determine whether the onboarding request is supported for the UE based at least in part on a capability of supporting onboarding and provisioning of a non-public network;
    determine whether to provide onboarding and provisioning services for the UE; and
    transmit an onboarding response indicating whether the onboarding and provisioning services for the UE is supported.

10. The apparatus of claim 9, wherein the executable instructions are programmed to:
  receive a provisioning request indicating the identity of the UE in an event that the onboarding response indicates that the onboarding and provisioning services for the UE is supported; and
  transmit a provisioning response including provisioning data.

11. An apparatus, comprising: at least one memory: at least one processor coupled with the at least one memory and configured to cause the apparatus to:
  receive an onboarding request for a user equipment (UE) indicating an identity of the VE and an onboarding and provisioning function (OPF) identity; and
  transmit a first onboarding request at least indicating the identity of the UE to a first OPF entity identified by the OPF identity when onboarding and provisioning services for the UE are not supported.

12. The apparatus of claim 11, wherein the at least one processor is configured to cause the apparatus to receive a first onboarding response indicating the onboarding and provisioning services for the UE are supported by the first OPF entity.

13. The apparatus of claim 11, wherein the at least one processor is configured to cause the apparatus to receive a first onboarding response indicating the onboarding and provisioning services for the UE are not supported by the first OPF entity.

14. The apparatus of claim 13, wherein:
  the first onboarding response further indicates an additional OPF identity; and
  the at least one processor is configured to cause the apparatus to transmit a second onboarding request including the identity of the UE to a second OPF entity identified by the additional OPF identity.

15. The apparatus of claim 14, wherein the at least one processor is configured to cause the apparatus to receive a second onboarding response indicating that the onboarding and provisioning services for the UE is supported by the second OPF entity.

16. The apparatus of claim 15, wherein the at least one processor is configured to cause the apparatus to:
   transmit a provisioning request; and
   receive provisioning data.

17. The apparatus of claim 16, wherein the provisioning data includes at least one off an indication whether the UE is to send an acknowledgement when receiving the provisioning data successfully, or subscription data including a subscriber identity, a credential, and a home network identity.

18. The apparatus of claim 17, wherein the subscription data further includes at least one of access control information or roaming information.

19. The apparatus of claim 15, wherein the at least one processor is configured to cause the apparatus to receive a second onboarding response indicating that the onboarding and provisioning services for the UE are not supported by the second OPF entity.

20. A method performed by a network equipment (NE), the method comprising:
   receiving a registration request for a user equipment (UE), wherein the registration request indicates an identity of the UE, an onboarding and provisioning flag, and an onboarding and provisioning function (OPF) identity;
   selecting an OPF entity at least based on the OPF identity;
   determining whether an onboarding request is supported for the UE based at least in part on a capability of supporting onboarding and provisioning of a non-public network; and
   transmitting the onboarding request at least indicating the identity of the UE to the selected OPF entity.

* * * * *